April 7, 1925.                                                                      1,532,480
J. W. FINCH
EYESHADE
Filed April 10, 1924
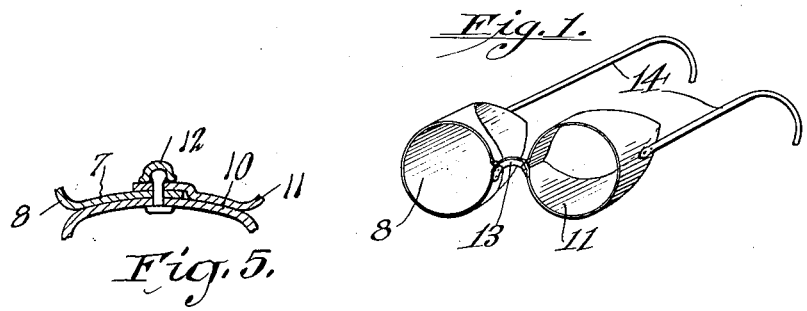
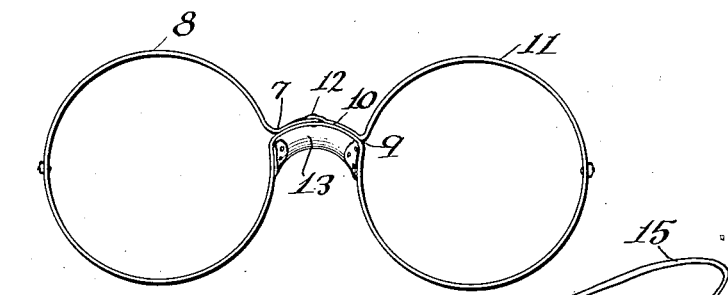
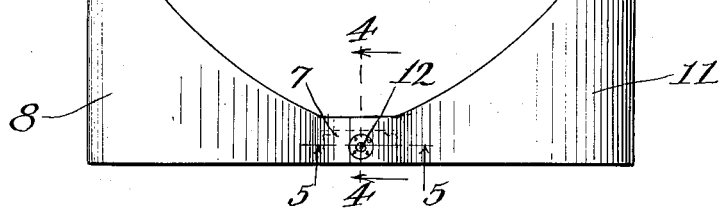
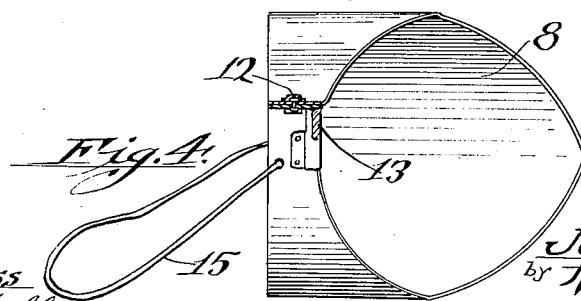
Inventor:
John W. Finch.

Patented Apr. 7, 1925.

1,532,480

UNITED STATES PATENT OFFICE.

JOHN W. FINCH, OF LOS ANGELES, CALIFORNIA.

EYESHADE.

Application filed April 10, 1924. Serial No. 705,495.

*To all whom it may concern:*

Be it known that I, JOHN W. FINCH, a citizen of the United States, residing at Los Angeles, in the county of Los Angeles and State of California, have invented new and useful Improvements in Eyeshades, of which the following is a specification.

This invention relates to eye shades.

An object of the invention is the provision of a simple, economical and efficient eye shade.

Another object of the invention is the provision of an eye shade capable of shading the eyes against glare from all sides.

A further object of the invention is the provision of an eye shade particularly adapted for use by automobile drivers.

With the foregoing objects in view, together with such other objects and advantages as may subsequently appear, this invention consists in the construction and arrangement of parts hereinafter described and claimed and illustrated in the accompanying drawings, in which:

Figure 1 is a perspective view of my improved eye shade, showing ear pieces attached thereto for holding the shade on the face, Fig. 2 is a front elevation of the eye shade shown in Fig. 1, Fig. 3 is a plan view of the shade shown in Fig. 1, a band, which may be of elastic material, being substituted for the ear pieces of Fig. 1, and Fig. 4 is a section taken on the line 4—4 of Fig. 3.

Fig. 5 is an enlarged sectional detail on the line 5—5 of Fig. 3 and looking in the direction indicated by the arrows.

Referring to the drawings for a more detailed description thereof, the eye shade proper is formed of a single piece of material, preferably flexible, which is shaped to form two loops, each loop being adapted to encircle, and extend from, an eye a suitable distance and formed to fit the contour of the face adjacent the eyes. One end portion of the material, of which the eye shade may be made, is indicated by the numeral 7. The material is bent to form a cylindrical portion 8 and is brought back under the end portion 7 and continued beyond it to a point 9, forming an arcuate branch 10. From the point 9 the material turns downwardly and is looped to form a cylindrical portion 11, being subsequently bent and brought to overlap the end portion 7. The ends of the material are secured together in any suitable manner, and the arcuate portion 10 is preferably fastened to the ends by a snap fastener 12. The cylindrical portions 8 and 11 are formed to fit the contour of the face, as clearly shown in the drawings. A nose bridge 13 is secured to the cylindrical members 8 and 11 by any suitable means, and preferably lies directly under the arcuate branch 10.

According to the form shown in Fig. 1, ear pieces 14 are secured respectively to the cylindrical members 8 and 11. In lieu of the ear pieces 14, a band 15, adapted to go around the head, may be employed, and this band may be elastic, at least, in part, to allow for adjustment to heads of different sizes.

This invention has been described, but modifications thereof may be devised without departing from the spirit thereof, and it is to be understood that such modifications come within the scope of this invention.

What is claimed is:

1. An eye shade comprising a single piece of flexible material shaped to form a nose bridge at the center of the material and the material extending both ways from the nose bridge and forming loops, and the ends of the material meeting and overlapping at the bridge portion and secured together and to the bridge portion by a snap fastener, corresponding ends of the loops and the bridge being shaped to fit the contour of a face around the eyes.

2. An eye shade comprising a single piece of flexible material shaped to form a nose bridge at the center of the material and the material extending both ways from the nose bridge and forming loops, and the ends of the material meeting and overlapping at the bridge portion and secured together and to the bridge portion by a snap fastener, corresponding ends of the loops and the bridge being shaped to fit the contour of a face around the eyes, and a secondary nose bridge fitting against the nose portion and secured to the loops.

3. An eye shade comprising a single piece of flexible material shaped to form a nose bridge at the center of the material and the material extending both ways from the nose bridge and forming loops, and the ends of the material meeting and overlapping at the bridge portion and secured together and to the bridge portion, corresponding ends of the loops and the bridge being shaped to fit the contour of a face around the eyes.

In testimony whereof I have signed my name to this specification.

JOHN W. FINCH.